United States Patent [19]

Suzuki et al.

[11] Patent Number: 4,910,405
[45] Date of Patent: Mar. 20, 1990

[54] X-RAY IMAGE SENSOR

[75] Inventors: Hiroyuki Suzuki; Kouichi Tamura; Tadashi Sato; Kunio Nakajima, all of Tokyo, Japan

[73] Assignee: Seiko Instruments Inc., Tokyo, Japan

[21] Appl. No.: 206,517

[22] Filed: Jun. 14, 1988

[30] Foreign Application Priority Data

Jun. 15, 1987 [JP] Japan .................. 62-148250

[51] Int. Cl.⁴ ............................. G01T 1/20
[52] U.S. Cl. ................. 250/368; 250/486.1
[58] Field of Search ............ 250/368, 486.1, 213 VT

[56] References Cited

U.S. PATENT DOCUMENTS 4,415,810 11/1983 Brown, Sr. .................. 250/484.1
4,649,276 3/1987 Suzuki et al. ................ 250/361 R

FOREIGN PATENT DOCUMENTS 1439096 10/1968 Fed. Rep. of Germany ...... 250/213 VT
3325035 1/1985 Fed. Rep. of Germany ... 250/486.1

OTHER PUBLICATIONS

Patent Abstracts of Japan, vol. 8, No. 252 (P-314([1689], 17th Nov. 1984; and JP-A-59 122 988 (Shimazu Seisakusho K. K.) 16-07-1984.
Patent Abstracts of Japan, vol. 6, No. 125 (P-127)[1003], 10th Jul. 1982; and JP-a-57 50 674 (Tokyo Shibaura Denki K.K.)25-03-1982.
Patent Abstracts of Japan, vol. 7, No. 168 (P-212)[1313], 23rd Jul. 1983; and JP-A-58 75 083 (Tokyo Shibaura Denki K.K.) 06-05-1983.

Primary Examiner—Constantine Hannaher
Attorney, Agent, or Firm—Bruce L. Adams; Van C. Wilks

[57] ABSTRACT

An X-ray image sensor comprises a fiber optic faceplate, a phospor screen formed on the X-ray incidence side of the faceplate and an image sensing device connected to the other side of the faceplate. A core material of the faceplate is a radiation shielding glass which comprises a compound of high atomic number element and cerium oxide. The sensor can prevent the X-ray radiation damage of the solid-state image sensing device.

20 Claims, 1 Drawing Sheet

X-RAY IMAGE SENSOR

BACKGROUND OF THE INVENTION

1. Field of the Invention

The present invention relates to an X-ray image sensor. More particularly, it relates to an X-ray image sensor having an excellent resistance to X-rays.

2. Description of the Related Art

An X-ray image sensor comprises a fiber optic faceplate, a phosphor screen for converting an X-ray image into a light image and an image sensing device such as a solidstate image and an image sensing device such as a solidstate image sensing device or a pick-up tube. The phosphor screen is formed on the X-ray incidence side of the fiber optic faceplate. The image sensing device is connected to the phosphor screen through the fiber optic faceplate.

In one example of the conventional X-ray image sensor,
the fiber optic faceplate is composed of flint glass optically bonded on the input side of the solid-state image sensing device and the phosphor screen is formed on the fiber optic faceplate.

In the conventional technique, X-rays are absorbed partly while being transmitted through the inside of the fiber optic faceplate, the fiber optic faceplate is browned by the X-rays and light generated in the phosphor screen is absorbed in the fiber optic faceplate, which results in deterioration of the detection sensitivity. Further, the X-rays transmitted through the fiber optic faceplate enter the solid-state image sensing device, which results in the increase of noise.

SUMMARY OF THE INVENTION

It is the primary object of the present invention to provide an X-ray image sensor by which the above-mentioned drawbacks of the conventional technique are overcome and
which has an excellent resistance to X-rays.

Another object of the present invention is to provide an X-ray image sensor of small size and low noise.

In accordance with the present invention, there is provided an X-ray image sensor comprising a fiber optic faceplate using a radiation shielding glass as a core material, a phosphor screen formed on the X-ray incidence side of the faceplate and an image sensing device connected to the other side of the faceplate.

DESCRIPTION OF THE PREFERRED EMBODIMENT

According to the present invention, the core material of an fiber optic faceplate comprises at least one compound composed of a high atomic number element such as lead oxide, barium oxide and lanthanum oxide, and cerium oxide. The core glass material has a large attenuation coefficient of X-rays and an excellent resistance to X-ray browning, so that the fiber optic faceplate can be shielded from X-rays incident on the image sensing device. The X-ray image sensor utilizing the fiber optic faceplate can prevent X-ray radiation damage to the image sensing device, reduce noise and prevent the browning of the fiber optic faceplate, and thereby enables construction of an X-ray image sensor of small size, long life and low noise.

The above-described construction operates in such a manner that the phosphor screen converts X-rays into light, and then the fiber optic faceplate transmits an optical image onto the input side of the solid-state image sensing device which transduces the optical image into an electric signal. Although the X-rays are transmitted through the phosphor screen,
they are absorbed in the core glass in a large degree because the core glass contains cerium oxide and has a large content of components composed of high atomic number elements.

Cerium oxide acts to prevent browning by X-rays, thus preventing the deterioration of the sensivity of detecting X-rays. In addition, the high atomic number elements inclusive of cerium act to absorb X-rays in a large degree.

Accordingly, the X-rays scarcely enter the solid-state image sensing device, and thus the increase of noise and
X-ray radiation damage can be prevented.

The present invention will now be described in detail with reference to the following examples.

EXAMPLE 1

Figure 1:
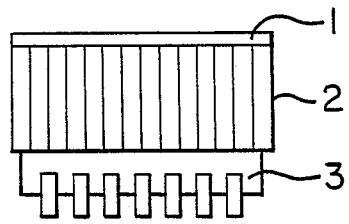
FIGS. 1 and 2 are sectional views of two embodiments of X-ray image sensors according to the present invention.

FIG. 1 is a sectional view of an X-ray image sensor according to the present invention. In FIG. 1, a phosphor screen 1 of zinc sulfide and the like is formed on the X-ray incidence side of a fiber optic network the form of a faceplate 2, and a solidstate image sensing device 3 is bonded on the other side of the faceplate.

The fiber optic faceplate is about 5 to 10 mm thick, and it can be used for X-rays of 100 kv or less. The solidstate image sensing device 3 and the fiber optic faceplate 2 may be connected together optically also by using a matching oil.

The composition of the core glass is shown in Table 1.

TABLE 1

| Components | Composition of core glass | | | | |
|---|---|---|---|---|---|
|  | PbO | $CeO_2$ | $Na_2O$ | $K_2O$ | $SiO_2$ |
| wt % | 40 | 1.7 | 8 | 5.1 | 45.2 |

TABLE 2

| Components | Composition of clad glass | | | | |
|---|---|---|---|---|---|
|  | $SiO_2$ | $Na_2O$ | $Al_2O_3$ | CaO | MgO |
| wt % | 72 | 15 | 1 | 9 | 3 |

It has been reported that the effect of prevention of browning by X-rays is not increased when the content of added cerium dioxide exceeds 1.8 wt % (Optical Technique Handbook, Asakurashoten, p. 566,1975).

It has been found that the preferred range of cerium dioxide to prevent X-ray browning and prevent deterioration of the detection sensitivity is 0.2 to 1.8 weight percent.

If the content of lead oxide as a component of the glass is enlarged, the X-ray absorbing capability of the glass is increased, but the browning by X-rays is also increased, which results in the deterioration of the X-ray detection sensitivity. The present composition can be used in the range up to $10^8$ R. As for the radiation shielding components, barium oxide, lanthanum oxide, etc. may be used other than lead oxide, and one or two or more of them may be used.

EXAMPLE 2

Figure 2:
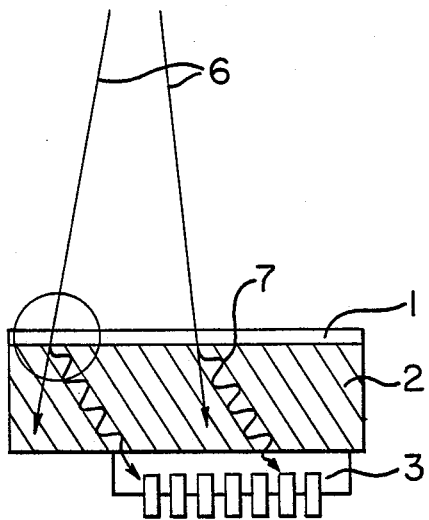

FIG. 2 illustrates a modified embodiment of the invention. The X-ray image sensor was prepared in accordance with Example 1 except that the fiber optic faceplate 2 is fitted with the optical path thereof inclined from the normal axis of the phosphor screen 1. In the present embodiment, the optical path of the fiber optic faceplate 2 is inclined by about 35 degrees from the normal axis of the input side of the phosphor screen 1.

Figure 3:
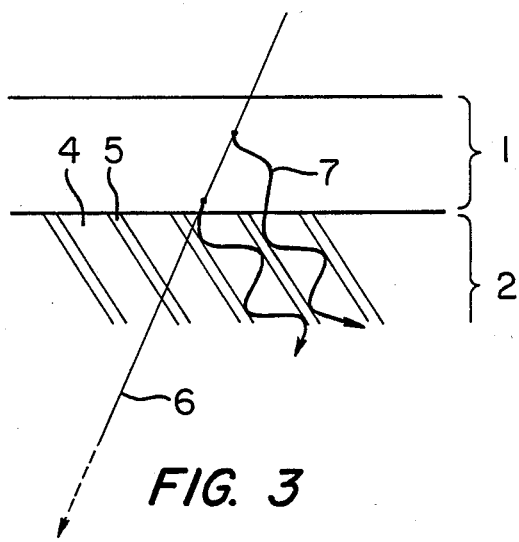
FIG. 3 is an enlarged sectional view of the X-ray image sensor shown in a circled portion of FIG. 2.

FIG. 3 is an enlarged view of a circled portion of FIG. 2. The fiber optic faceplate 2 is constructed of a core 4 through which light propagates and a clad 5. The diameter of the core is about 25 microns, the thickness of the clad about 5 microns, and the thickness of the phosphor screen about 20 microns. By inclining the optical axis of the fiber optic faceplate relative to the phosphor screen, the amount of X-rays transmitted through the fiber optic faceplate can be reduced. The clad 5 also transmits X-rays. However, since the optical path of the fiber optic faceplate has some angle to the normal axis of the phosphor screen, the X-rays are absorbed in a large degree in the core portion instead of being transmitted only through the clad portion. The X-ray image sensor can be used for X-rays of above 100 KV.

The refractive index of the clad glass needs to be smaller than that of the core glass in accordance with the principle of an optical fiber; however, the refractive index is enlarged when such a high atomic number element as lead or barium, for instance, is contained in the glass. Accordingly, it is difficult to give the clad glass a large X-ray absorbing capability, and when X-rays are incident in the direction of the optical path of the fiber optic faceplate, they are transmitted through the clad and enter the solid-state image sensing device. On the other hand, when the fiber optic faceplate and the phosphor screen are arranged so that at least a portion of the optical axis of the fiber optic faceplate inclines relative to the phosphor screen, the X-rays scarcely enter the solid-state image sensing device.

It is apparent, in the present embodiment, that X-rays can not be transmitted only through the clad, since the clad is about 5 microns thick and inclines at an angle of 35 degrees and since the fiber optic plate is 5 to 10 mm thick.

In the X-ray image sensor wherein the phosphor screen for converting an X-ray image into a light image is coupled optically to the image sensing device such as a pick-up tube or a solid-state image sensing device with the fiber optic faceplate interposed between, the present invention makes it possible to provide the X-ray image sensor of small size, long life and low noise, as described above, by using radiation shielding glass for shielding radiations including X-rays as a core material of the fiber optic faceplate to prevent browning and thereby to attain long life and high sensitivity. Furthermore, by fitting the fiber optic faceplate so that the optical path thereof is inclined from the normal axis of the phosphor screen, X-ray radiation damage to the solid-state image sensing device and increase of noise are presented.

What is claimed is:

1. An X-ray image sensor comprising:
    a fiber optic faceplate having a radiation shielding glass as a core material, the radiation shielding glass containing 0.2 to 1.8 weight percent of cerium dioxide;
    a phosphor screen disposed on an X-ray incidence side of the fiber optic faceplate; and
    an image sensing device optically coupled to the other side of the fiber optic faceplate.

2. An X-ray image sensor according to claim 1; wherein at least a portion of the optical axis of the fiber optic faceplate is inclined to the phosphor screen.

3. An X-ray image sensor according to claim 2; wherein the radiation shielding glass contains at least one compound of a high atomic number element.

4. An X-ray image sensor according to claim 3; wherein the compound is selected from the group consisting of lead oxide, barium oxide and lanthanum oxide.

5. An X-ray image sensor according to claim 1; wherein the radiation shielding glass contains at least one compound of a high atomic number element.

6. An X-ray image sensor according to claim 5; wherein the compound is selected from the group consisting of lead oxide, barium oxide and lanthanum oxide.

7. An X-ray image sensor comprising: converting means for converting incident X-ray radiation into light radiation; a fiber optic network having an input side disposed to receive light radiation and some X-ray radiation transmitted by the converting means and an output side for exiting light radiation propagated through the fiber optic network, the fiber optic network comprising a plurality of optical fibers composed of radiation shielding glass fibers containing cerium dioxide in an amount effective to prevent browning of the fiber optic network due to X-rays propagating therethrough; and an image sensing device optically coupled to the output side of the fiber optic network for converting light radiation propagated through the fiber optic network into electric signals.

8. An X-ray image sensor according to claim 7; wherein the radiation shielding glass fibers contain at least one compound comprised of a high atomic number element effective to increase the X-ray radiation absorption property of the radiation shielding glass.

9. An X-ray image sensor according to claim 8; wherein the compound is selected from the group consisting of lead oxide, barium oxide, lanthanum oxide and combinations thereof.

10. An X-ray image sensor according to claim 9; wherein the cerium dioxide is present in an amount 0.2 to 1.8 weight percent of the radiation shielding glass.

11. An X-ray image sensor according to claim 8; wherein the cerium dioxide is present in an amount 0.2 to 1.8 weight percent of the radiation shielding glass.

12. An X-ray image sensor according to claim 7; wherein the cerium dioxide is present in an amount 0.2 to 1.8 weight percent of the radiation shielding glass.

13. An X-ray image sensor according to claim 7; wherein at least a portion of the optical axes of the optical fibers is inclined at an angle to the plane at which radiation exits the converting means.

14. An X-ray image sensor according to claim 13; wherein the optical fibers comprise cladded fibers having a core of radiation shielding glass covered by a clad of glass of different composition than the core.

15. An X-ray image sensor according to claim 14; wherein the fiber cores have a diameter of about 25 microns and the fiber clads have a thickness of about 5 microns.

16. An X-ray image sensor according to claim 13; wherein the fiber optic network comprises a fiber optic faceplate having planar input and output sides.

17. An X-ray image sensor according to claim 16; wherein the converting means comprises a phosphor screen disposed on the planar input side of the fiber optic faceplate.

18. An X-ray image sensor according to claim 13; wherein the cerium dioxide is present in an amount 0.2 to 1.8 weight percent of the radiation shielding glass.

19. An X-ray image sensor according to claim 7; wherein the fiber optic network comprises a fiber optic faceplate having planar input and output sides.

20. An X-ray image sensor according to claim 19; wherein the converting means comprises a phosphor screen disposed on the planar input side of the fiber optic faceplate.

* * * * *